United States Patent
Suenaga et al.

(10) Patent No.: US 10,408,335 B2
(45) Date of Patent: Sep. 10, 2019

(54) VEHICLE DRIVE APPARATUS

(71) Applicant: TOYOTA JIDOSHA KABUSHIKI KAISHA, Toyota-shi, Aichi-ken (JP)

(72) Inventors: Shinichiro Suenaga, Susono (JP); Ryuichi Hasegawa, Susono (JP); Masato Watanabe, Toyota (JP); Tatsuo Obata, Toyota (JP); Satoshi Miyanaga, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 425 days.

(21) Appl. No.: 15/122,512

(22) PCT Filed: Mar. 4, 2015

(86) PCT No.: PCT/IB2015/000275
§ 371 (c)(1),
(2) Date: Aug. 30, 2016

(87) PCT Pub. No.: WO2015/136344
PCT Pub. Date: Sep. 17, 2015

(65) Prior Publication Data
US 2017/0067554 A1 Mar. 9, 2017

(30) Foreign Application Priority Data
Mar. 12, 2014 (JP) .................................. 2014-049249

(51) Int. Cl.
*F16H 57/04* (2010.01)
*B60K 6/40* (2007.10)
(Continued)

(52) U.S. Cl.
CPC ......... *F16H 57/0476* (2013.01); *B60K 6/365* (2013.01); *B60K 6/40* (2013.01);
(Continued)

(58) Field of Classification Search
CPC ............. F16H 57/0409; F16H 57/0423; F16H 57/0457; F16H 57/0476; F16H 57/0494; B60K 6/365; B60K 6/445; B60K 11/02
See application file for complete search history.

(56) References Cited

U.S. PATENT DOCUMENTS

2009/0127954 A1* 5/2009 Mogi .................... B60K 17/12
310/90
2011/0230292 A1* 9/2011 Komatsu ................ B60K 6/365
475/5

FOREIGN PATENT DOCUMENTS

JP H03-45407 U 4/1991
JP 2000-335263 A 12/2000
(Continued)

*Primary Examiner* — William C Joyce
(74) *Attorney, Agent, or Firm* — Oliff PLC

(57) ABSTRACT

An apparatus includes a case, a motor, a gear mechanism, a lubrication mechanism, and a cooling mechanism. The motor and the gear mechanism are housed in the case. The gear mechanism includes a specified gear and a first gear. A vertical lower section of the first gear is positioned above a surface of the oil. The lubrication mechanism lubricates the gear mechanism by the oil thrown up by the specified gear. The cooling mechanism includes an oil pump and a pipe. The oil pump and the pipe supply the oil reserved in the case to the motor. The pipe is located above the first gear. The pipe has a hole, and the oil discharged from the hole. The hole is positioned above the first gear. A normal line direction of the hole differs from a vertically downward direction. The first gear does not overlap the normal line direction.

5 Claims, 3 Drawing Sheets

(51) Int. Cl.
    *B60K 6/405*         (2007.10)
    *B60K 6/365*         (2007.10)
    *B60K 6/445*         (2007.10)
    *B60K 11/02*        (2006.01)

(52) U.S. Cl.
    CPC .............. *B60K 6/405* (2013.01); *B60K 6/445* (2013.01); *B60K 11/02* (2013.01); *F16H 57/0409* (2013.01); *F16H 57/0423* (2013.01); *F16H 57/0457* (2013.01); *F16H 57/0494* (2013.01); *B60Y 2200/92* (2013.01); *B60Y 2306/03* (2013.01); *B60Y 2306/05* (2013.01); *B60Y 2400/73* (2013.01); *Y10S 903/902* (2013.01)

(56) References Cited

FOREIGN PATENT DOCUMENTS

| | | |
|---|---|---|
| JP | 2011-152814 A | 8/2011 |
| JP | 2011-256969 A | 12/2011 |

\* cited by examiner

VEHICLE DRIVE APPARATUS

BACKGROUND OF THE INVENTION

1. Field of the Invention

The present invention relates to a vehicle drive apparatus including an electric motor.

2. Description of Related Art

In a vehicle drive apparatus that includes an electric motor, a system for supplying oil that is thrown up by a specified gear in the drive apparatus to a gear and a bearing and for supplying the pumped-up oil by an oil pump to the an electric motor has been adopted for a mechanism that lubricates the gear and the bearing and cools the electric motor, the oil pump being disposed along with the gear. There is a case where an oil amount supplied to the gear and the bearing is changed by an oil temperature, and thus it may be difficult to constantly and sufficiently secure a required oil amount. For example, when the oil temperature is low, viscosity of the oil is high. Thus, the oil amount that is supplied to the bearing for a purpose of lubrication may be reduced. On the other hand, when the oil temperature is high, the viscosity of the oil is low. Consequently, a larger oil amount than the required oil amount is thrown up and supplied to the gear and the bearing. Thus, agitation loss of the oil may be increased.

On the contrary to the above, Japanese Patent Application Publication No. 2011-152814 (JP 2011-152814 A) discloses a hybrid vehicle drive apparatus that includes a motor chamber and a gear chamber that are formed with a partitioning wall being formed therebetween. The motor chamber houses an electric motor within a case, and the gear chamber houses various types of gears. Oil reserved in a lower section of the gear chamber is pumped up by an oil pump and supplied to a feed pump for supplying the oil to the gear chamber and the motor chamber. This feed pump is provided with a thermostat that can block a flow of the lubrication oil from the gear chamber side to the motor chamber side. Furthermore, a communicating section of the partitioning wall communicates between the motor chamber and the gear chamber and is provided with a solenoid valve, an opened/closed state of which is controlled in accordance with an oil temperature detected by an oil temperature sensor. In the vehicle drive apparatus that is configured as above, the opened/closed state of the solenoid valve is controlled in accordance with the oil temperature detected by the oil temperature sensor, and distribution of the oil to the motor chamber and the gear chamber is adjusted to be optimal. For example, the thermostat blocks the oil supply to the motor chamber and closes the solenoid valve in an extremely low temperature condition. Accordingly, the oil supply to the motor chamber is stopped, and the oil is circulated within the gear chamber. In other words, an oil circulation area is reduced, so as to promptly increase the oil temperature. For example, once the oil is heated to a high temperature, the thermostat permits the oil supply to the motor chamber and thus opens the solenoid valve. Accordingly, the oil circulation area is expanded, so as to promptly lower the oil temperature.

SUMMARY OF THE INVENTION

Although the oil amount can be controlled optimally in the above hybrid vehicle drive apparatus disclosed in JP 2011-152814 A, cost thereof is significantly increased by adding the oil temperature sensor, the solenoid valve, and the like. Thus, application of the above technique may be difficult in terms of cost performance.

The present invention provides a vehicle drive apparatus that includes an electric motor, can efficiently lubricate a gear, and can cool the electric motor with a simple structure.

A first aspect of the present invention is a vehicle drive apparatus that includes a case in which oil is reserved, an electric motor housed in the case, a gear mechanism, a lubrication mechanism, and a cooling mechanism. The gear mechanism is housed in the case, and the gear mechanism includes a specified gear and a first gear. A vertical lower section of the first gear is positioned above a surface of the oil in a vertical direction. The lubrication mechanism is configured to lubricate the gear mechanism by the oil that is thrown up by the specified gear. The cooling mechanism includes an oil pump and a pipe. The cooling mechanism is configured to pressure-feed the oil reserved in the case by the oil pump, and supply the oil to the electric motor to cool the electric motor. The pipe is configured to feed the oil discharged from the oil pump to the electric motor. The pipe is located above the first gear in the vertical direction, and the pipe has a hole. Some of the oil flowing through the pipe is discharged from the hole, and the hole is positioned above the first gear in the vertical direction. The hole is arranged at a position where a normal line direction of the hole differs from a vertically downward direction from the hole. The first gear is arranged at a position where the first gear does not overlap the normal line direction of the hole.

In the gear mechanism, an amount of the oil that is supplied to the gear (the first gear) by throwing up the oil tends to be insufficient when viscosity of the oil is high, the vertical lower section of the gear being arranged above the surface of the oil in the vertical direction. Thus, particularly, when the viscosity of the oil is high, it is necessary to lubricate the first gear. On the contrary, with such a configuration as above, when an oil temperature is low and the viscosity of the oil is high, some of the oil that is pressure-fed from the oil pump is dripped vertically downward from the hole of the pipe and then supplied to the gear that needs to be lubricated. Just as described, when the viscosity of the oil is high and a required oil amount for lubrication of the first gear is difficult to be secured, some of the oil used to cool the electric motor can be used to lubricate the first gear. On the other hand, when the oil temperature is high and the viscosity of the oil is low, some of the oil that is pressure-fed from the oil pump is splashed from the hole of the pipe in the normal line direction. Since the first gear is not arranged in the normal line direction, the oil is not supplied to the first gear. Just as described, when the viscosity of the oil is low and the required oil amount for the lubrication of the first gear is easily secured, a larger oil amount than a necessary amount is prevented from being supplied to the first gear. Thus, agitation loss can be reduced. As described above, a supply destination of the oil that is discharged from the hole is switched in accordance with the oil temperature. Therefore, the first gear and the electric motor can efficiently be cooled.

In the vehicle drive apparatus, the case may be arranged in the normal line direction of the hole, and the case may be configured to be exposed to a traveling wind. With such a configuration, the oil adhered to the case is promptly cooled. Thus, cooling of the oil can be promoted at the high oil temperature.

The vehicle drive apparatus may further include an engine, a drive wheel, a countershaft, a first electric motor, a second electric motor, a power distribution mechanism, a counter driven gear, an output gear, a power transmission shaft. The countershaft may be configured to transmit power of the engine to the drive wheel. The power distribution mechanism may be configured to distribute the power the first electric motor and an output shaft. The counter driven gear may be arranged on the countershaft. The output gear may be arranged on the output shaft. The power transmission shaft may be configured to transmit the power to a rotor shaft of the second electric motor. The engine, the first electric motor, and the power distribution mechanism may be arranged on a first axis. The countershaft may be arranged on a second axis. The second electric motor and the power transmission shaft may be arranged on a third axis. The counter driven gear may mesh with the output gear and the counter driven gear may mesh with a gear that is disposed on the power transmission shaft. The first gear may be the counter driven gear. With such a configuration, it is possible to supply an optimum amount of the oil to the counter driven gear to which the oil is not easily supplied at a low oil temperature.

The vehicle drive device may further include: a first catch tank and a second catch tank. The first catch tank may be arranged at a position in the normal line direction of the hole, and the first catch tank may be configured to supply the oil to a bearing and receive the oil discharged from the hole in the normal line direction, the bearing may be configured to support the rotor shaft of the electric motor. The second catch tank may be arranged at a position below the hole in the vertical direction, and the second catch tank may be configured to supply the oil to a gear that needs to be lubricated, and the second catch tank may be configured to receive the oil dripped vertically downward from the hole. The pipe may be arranged to be tilted with respect to a horizontal line. With such a configuration, for example, when the viscosity of the oil is high and it is difficult to secure a required oil amount for lubrication of the first gear, the oil is dripped vertically downward from the hole and is supplied to the second catch tank. Accordingly, the required oil amount is supplied to the first gear via the second catch tank. On the other hand, when the oil temperature is high and the viscosity of the oil is low, the oil is released from the hole in the normal line direction. Accordingly, the oil is supplied to the first catch tank, and the oil is preferentially supplied to the bearing of the rotor shaft via the first catch tank. Thus, abrasion resistance of the bearing that is actuated at a high rotational speed and a high temperature is improved.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Here, the normal direction of the hole preferably corresponds to a perpendicular direction to a tangent plane contacting the hole or a direction along a radial line that extends in a radial direction from the center of the pipe and passes the center of the hole.

A detailed description will hereinafter be made on examples of the present invention with reference to the drawings. Noted that the drawings are appropriately simplified or deformed for the following examples, and thus a dimensional ratio, a shape, and the like of each component is not necessarily depicted to be accurate.

Figure 1:
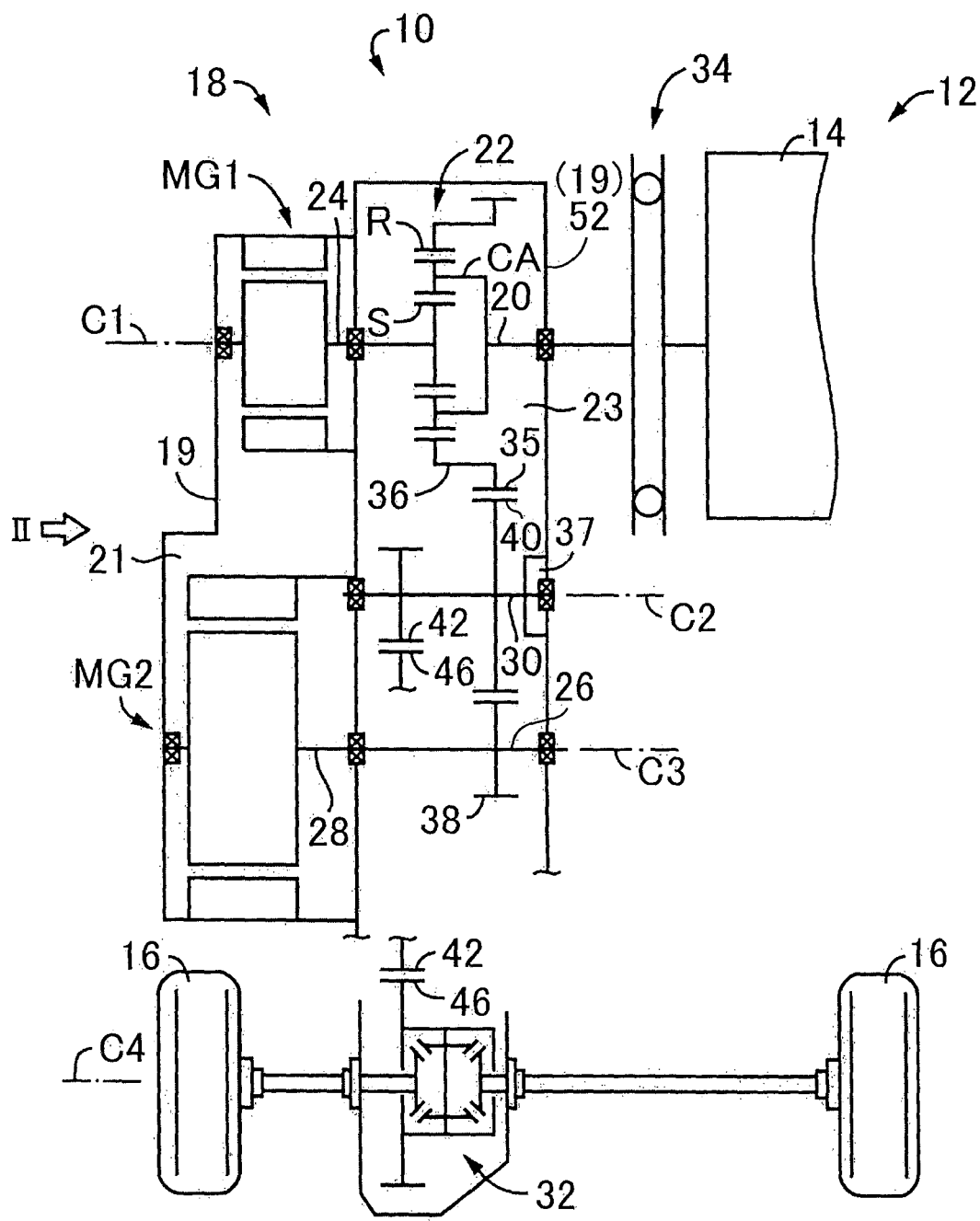
FIG. 1 is a skeletal view for illustrating a structure of a drive apparatus that is provided in a hybrid vehicle and to an example of the present invention is applied.

FIG. 1 is a skeletal view for illustrating a structure of a vehicle drive apparatus 12 (hereinafter, a drive apparatus 12) that is provided in a hybrid vehicle 10 of this example. The vehicle drive apparatus 12 includes: an engine 14 such as a known gasoline engine or a known diesel engine that functions as a traveling drive power source (a power source); and a vehicle power transmission 18 (hereinafter referred to as a power transmission 18) that transmits power of the engine 14 to drive wheels 16. The power transmission 18 is formed with a case 19 that is formed with a motor chamber 21 and a gear chamber 23. A first electric motor MG1 and a second electric motor MG2 are housed in the motor chamber 21, and various types of gears are housed in the gear chamber 23. The power transmission 18 is configured by including four rotational axes (C1 to C4) in the case 19 that serves as a casing of the power transmission 18. The four rotational axes (C1 to C4) are parallel to each other. The first axis C1 corresponds to a rotational axis of the engine 14. The engine 14, the first electric motor MG1, and a power distribution mechanism 22 are arranged on the first axis C1. The power distribution mechanism 22 distributes the power of the engine 14 to the first electric motor MG1 and a composite gear shaft 36, which will be described below. A countershaft 30 that is configured to be able to transmit power to the drive wheel 16 is rotatably arranged on the second axis C2. The second electric motor MG2 and a power transmission shaft 26 that is coupled to a second rotor shaft 28 of the second electric motor MG2 are arranged on the third axis C3. A differential gear 32 that functions as a differential gear device is arranged on the fourth axis C4. In this way, the drive apparatus 12 houses the first electric motor MG1 and the second electric motor MG2 (the electric motors) in the motor chamber 21, and also houses various types of the gears in the gear chamber 23 in the case 19. Noted that various types of the gears, which are housed in the gear chamber 23 and configured to be able to transmit power, correspond to a gear mechanism of the present invention.

On the first axis C1, the engine 14 is coupled to an input shaft 20 via a damper device 34. The power distribution mechanism 22 that includes a planetary gear train is interposed between the input shaft 20 and the first electric motor MG1. The power distribution mechanism 22 mainly includes: a sun gear S and a ring gear R that can rotate about the first axis C1; and a carrier CA that supports a pinion gear to allow rotation and revolution thereof, the pinion gear meshing with the sun gear S and the ring gear R. The sun gear S is coupled to a first rotor shaft 24 of the first electric motor MG1 in a manner incapable of relative rotation. The carrier CA is connected to the engine 14 via the input shaft 20, the damper device 34, and the like. The ring gear R is integrally formed with an inner periphery of the composite gear shaft 36 that is formed with a counter drive gear 35. Thus, the counter drive gear 35 integrally rotates with the ring gear R. The counter drive gear 35 corresponds to the output gear, and the composite gear shaft 36 corresponds to the output shaft.

The countershaft 30 that is arranged on the second axis C2 is integrally formed with a counter driven gear 40 and a differential drive gear 42. The counter driven gear 40 meshes with the counter drive gear 35 and a reduction gear 38, and the reduction gear 38 is formed in the power transmission shaft 26. The differential drive gear 42 meshes with a differential ring gear 46 formed in the differential gear 32. With such a configuration, the power output from the power distribution mechanism 22 is transmitted to the countershaft 30 via the counter drive gear 35 and the counter driven gear 40. In addition, an oil pump 37 that is driven by the countershaft 30 is provided in a side wall 52, and the side wall 52 is formed on the engine 14 side in an axial direction of the case 19. The reduction gear 38 corresponds to the gear that is formed in the power transmission shaft, the counter driven gear 40 corresponds to the first gear, and the side wall 52 corresponds to the case that is hit by a traveling wind.

On the third axis C3, the second rotor shaft 28 of the second electric motor MG2 is connected to the power transmission shaft 26 via a spline-fitted section, which is not shown, in a manner incapable of relative rotation (in other words, capable of power transmission). The power transmission shaft 26 is formed with the reduction gear 38, and the reduction gear 38 meshes with the counter driven gear 40 that is formed in the countershaft 30. With such a configuration, power of the second electric motor MG2 is transmitted to the countershaft 30 via the power transmission shaft 26, the reduction gear 38, and the counter driven gear 40. The second rotor shaft 28 corresponds to the rotor shaft of the second electric motor MG2.

The differential gear 32 that is arranged on the fourth axis C4 is configured by including the differential ring gear 46, and the differential ring gear 46 meshes with the differential drive gear 42 of the countershaft 30. The differential gear 32 functions as a differential mechanism that appropriately produces a difference in rotational speed between a right and left pair of the drive wheels 16. In this way, power of the countershaft 30 is transmitted to the drive wheels 16 via the differential drive gear 42, the differential ring gear 46, and the differential gear 32. In other words, the countershaft 30 is configured to enable power transmission to the drive wheels 16. The differential ring gear 46 corresponds to the specified gear.

With the drive apparatus 12 that is configured as above, a vehicle can travel by using the power of the engine 14. In addition, for example, when a vehicle speed is low, the engine 14 is stopped, and the vehicle can travel by using the power of the second electric motor MG2. Meanwhile, the first electric motor MG1 and the second electric motor MG2 are arranged on the different rotational axes, and thus, an axial length of the drive apparatus 12 is reduced.

Figure 2:
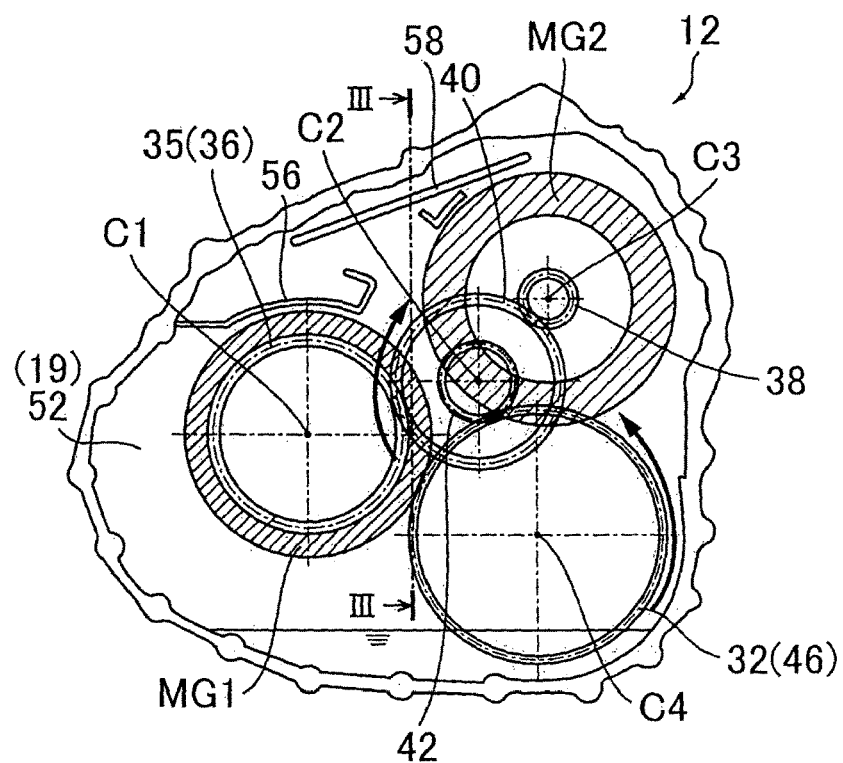
FIG. 2 is a side view in which the drive apparatus in FIG. 1 is seen from an arrow II side according to the example.

FIG. 2 is a side view in which the drive apparatus 12 in FIG. 1 is seen from an arrow II side. In FIG. 2, positional relationships among the first axis C1 to the fourth axis C4, an arranged position of each of rotational members arranged on the first axis C1 to the fourth axis C4, meshed states of various types of the gears are shown in a simplified manner. In FIG. 2, an upper side thereof corresponds to a vertical upper side, and the case 19 corresponds to the side wall 52 (see FIG. 1) of the case 19 that is interposed between the power transmission 18 and the damper device 34. As shown in FIG. 2, the first axis C1 to the fourth axis C4 are not actually arranged on the same straight line. The third axis C3 as a rotational axis of each of the second electric motor MG2 and the power transmission shaft 26 is positioned vertically uppermost, and the fourth axis C4 as a rotational axis of the differential gear 32 is positioned vertically lowermost. The counter driven gear 40 meshes with the counter drive gear 35 and the reduction gear 38. The differential drive gear 42 meshes with the differential ring gear 46.

A vertical lower section of the differential ring gear 46 of the differential gear 32 is soaked in oil that is reserved in a lower section of the gear chamber 23 in the case 19. Thus, when the differential gear 32 and the counter driven gear 40 rotate, the oil reserved in a lower section of the case 19 is thrown up as indicated by bold arrows. Then, the oil is supplied to the bearings that respectively support various types of the gears and the rotational shafts, and thus lubricates the bearings. Just as described, the drive apparatus 12 is provided with a mechanism for lubricating various types of the gears and the bearings by throwing up the oil (a lubrication mechanism). Some of the thrown-up oil is temporarily stored in a catch tank 56 that is formed above the side wall 52. Thus, oil agitation resistance during traveling is reduced.

A mechanism (a cooling mechanism) is provided. The cooling mechanism pressure-feeds the pumped-up oil by the oil pump 37 to a cylindrical bypass pipe 58 that is provided in the side wall 52 in FIG. 2, feeds the oil from an oil passage, which is not shown, to the motor chamber 21 via the bypass pipe 58, and supplies the oil to the first electric motor MG1 and the second electric motor MG2 housed in the motor chamber 21 for cooling. The bypass pipe 58 corresponds to the pipe.

The bypass pipe 58 is provided at a position where a portion thereof located above the counter driven gear 40 in the vertical direction. Furthermore, a discharge hole 62 for discharging some of the oil that flows through the bypass pipe 58 is formed in a portion of the bypass pipe 58, that is, a portion of the bypass pipe 58 that is located above the counter driven gear 40 in the vertical direction. One or a plurality of these discharge holes 62 is formed in an area above the counter driven gear 40 in the vertical direction. The discharge hole 62 corresponds to the hole for discharging some of the oil that flows through the pipe.

Figure 3:
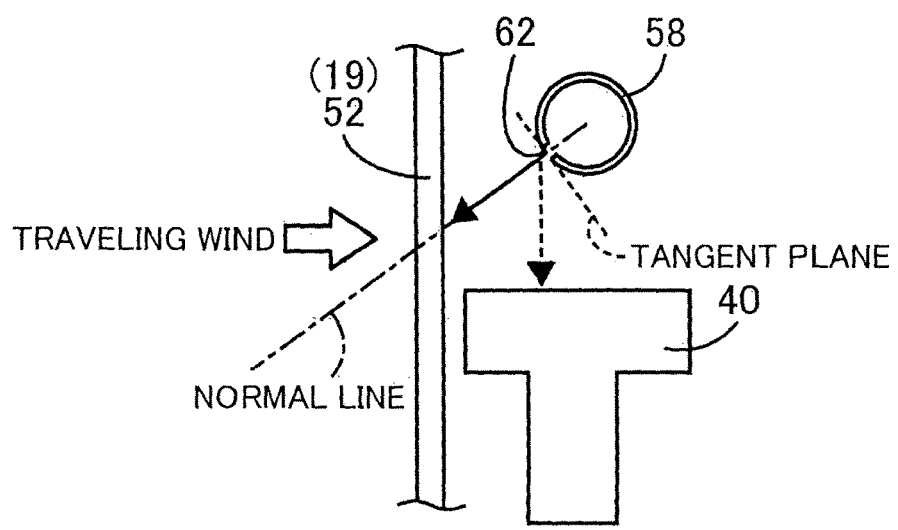
FIG. 3 is a view in which a cross section taken along in FIG. 2 is simplified according to the example.

FIG. 3 is a view in which a cross section taken along in FIG. 2 is simplified. As shown in FIG. 3, a circumferential position of the discharge hole 62 does not correspond to a vertically downward position in a circumferential direction of the bypass pipe 58, but is set at a position where the counter driven gear 40 is not arranged in a normal line direction of the discharge hole 62 indicated by a chain line (a direction perpendicular to a tangent plane indicated by a broken line that contacts the discharge hole 62). In other words, the discharge hole 62 formed in the bypass pipe 58 is formed at the position where the normal line direction of the discharge hole 62 differs from a vertically downward direction from the discharge hole 62. In addition, the counter driven gear 40 is arranged at a position where it does not overlap the normal line direction of the discharge hole 62. In this example, the discharge hole 62 is formed at a position that is displaced by a specified angle less than 90 degrees in the circumferential direction from a vertical lower end of the bypass pipe 58. The side wall 52 of the case 19 is arranged in the normal line direction of the discharge hole 62. This side wall 52 is structured to be exposed to a traveling wind during traveling of the vehicle. Thus, the oil adhered to the side wall 52 is promptly cooled by the traveling wind.

A description will be made on lubrication of various types of the gears and the bearings and cooling of the electric motor in the drive apparatus 12 that are configured as described above. As described above, the oil reserved in the lower section of the case 19 is thrown up in conjunction with the rotation of the differential ring gear 46 and the counter driven gear 40 during traveling of the vehicle. In this way, the thrown-up oil is supplied to various types of the gears that are housed in the gear chamber 23 and to the bearings that respectively support the rotational shafts. Thus, various types of the gears and the bearings are lubricated. The oil reserved in the lower section of the gear chamber 23 is pumped up by the oil pump 37 provided in the gear chamber 23 side and is then pressure-fed into the bypass pipe 58. The bypass pipe 58 communicates with a cooling oil passage, which is not shown and formed in the motor chamber 21 side, via an oil passage, which is not shown. Accordingly, the oil flowing through the bypass pipe 58 is supplied to the first electric motor MG1 and the second electric motor MG2, which are housed in the motor chamber 21, and used to cool the first and second electric motors MG1, MG2. Some of the oil flowing through the bypass pipe 58 is discharged from the discharge hole 62 formed in the bypass pipe 58.

In this example, the bearing for supporting the countershaft 30, which is provided with the counter driven gear 40, is configured by including a tapered bearing. Thus, a required oil amount of the bearing is large. The counter driven gear 40 is arranged such that a vertical lower section thereof is located above a surface of the oil reserved in the lower section of the gear chamber 23 in the case 19 in the vertical direction. More specifically, the counter driven gear 40 is arranged in a state that the vertical lower section thereof does not contact the oil reserved in the case 19. Thus, particularly when the oil temperature is low and viscosity of the oil is high, it is difficult to secure the required oil amount. When the oil temperature is low, just as described, the oil is not splashed from the discharge hole 62 of the bypass pipe 58 in the normal line direction but is dripped vertically downward by own weight as indicated by a broken arrow, and is then supplied to the counter driven gear 40. Then, the oil is agitated by the counter driven gear 40. As a result, the oil is also supplied to the bearing that rotatably supports the countershaft 30 in which the counter driven gear 40 is formed.

As described above, when the oil temperature is low, the viscosity of the oil is high. Thus, it is difficult to supply the required oil amount to the counter driven gear 40 by throwing up the oil. Meanwhile, the oil that is discharged from the discharge hole 62 of the bypass pipe 58 is directly supplied to the counter driven gear 40. Thus, the oil is agitated, and the oil supply to the counter driven gear 40 and the bearing for supporting the counter driven gear 40 is increased. In this way, seize resistance of the counter driven gear 40 and the bearing for supporting the counter driven gear 40 is secured.

Next, a case where the oil temperature is high will be described. When the oil temperature is high, the viscosity of the oil is low. Thus, the oil that is splashed from the discharge hole 62 of the bypass pipe 58 shoots out in the normal line direction as indicated by a solid arrow (the direction along the normal line that is indicated by the chain line). As a result, the oil that is splashed in the normal line direction is adhered to the side wall 52 of the case 19, and thus is not supplied to the counter driven gear 40. Since the side wall 52 is cooled by the traveling wind, the oil adhered to the side wall 52 is also promptly cooled.

As described above, when the oil temperature is high, the viscosity of the oil is low. Thus, the amount of the thrown-up oil is increased, and the agitation resistance caused by the oil agitation tends to be increased. However, the oil that is discharged from the discharge hole 62 shoots out in the normal line direction and is adhered to the side wall 52 of the case 19. Thus, the oil supply to the counter driven gear 40 is prevented, and increased agitation loss of the oil is also prevented. The oil that is adhered to the side wall 52 of the case 19 is promptly cooled by the side wall 52 that is cooled by the traveling wind. That is, cooling by the traveling wind is promoted, and thus cooling performance of the oil is enhanced at the high oil temperature. Thus, cooling performance of each of the first electric motor MG1 and the second electric motor MG2 is also improved.

As described above, according to this example, when the oil temperature is low and the viscosity of the oil is high, for example, some of the oil that is pressure-fed from the oil pump 37 is dripped vertically downward from the discharge hole 62 of the bypass pipe 58 and is then supplied to the counter driven gear 40. Just as described, when the viscosity of the oil is high and it is difficult to secure the required oil amount for the lubrication of the counter driven gear 40, some of the oil that is used to cool the first electric motor MG1 and the second electric motor MG2 can be used to lubricate the counter driven gear 40. On the other hand, when the oil temperature is high and the viscosity of the oil is low, some of the oil that is pressure-fed from the oil pump 37 is splashed in the normal line direction from the discharge hole 62 of the bypass pipe 58, and thus the oil is not supplied to the counter driven gear 40. Just as described, in the case where the oil temperature is high, where the viscosity of the oil is low, and where the required oil amount for the lubrication of the counter driven gear 40 is easily secured, a larger oil amount than the required oil amount is prevented from being supplied to the counter driven gear 40, and thus the agitation loss can be reduced. Therefore, as described above, reliability at the low oil temperature can be improved without increasing the agitation loss at the high oil temperature.

According to this example, the side wall 52 of the case 19, which is hit by the traveling wind, is arranged in the normal line direction of the discharge hole 62. Thus, the oil adhered to the side wall 52 is promptly cooled, and cooling of the high-temperature oil can be prompted.

According to this example, the oil that is discharged from the discharge hole 62 at the low oil temperature is supplied to the counter driven gear 40. Thus, it is possible to supply an optimum amount of the oil to the counter driven gear 40 to which the oil is not easily supplied at the low oil temperature.

Next, another example of the present invention will be described. Components in the following description that are common in the above-described example are denoted by the same reference numerals, and the description thereof will not be repeated.

Figure 4:
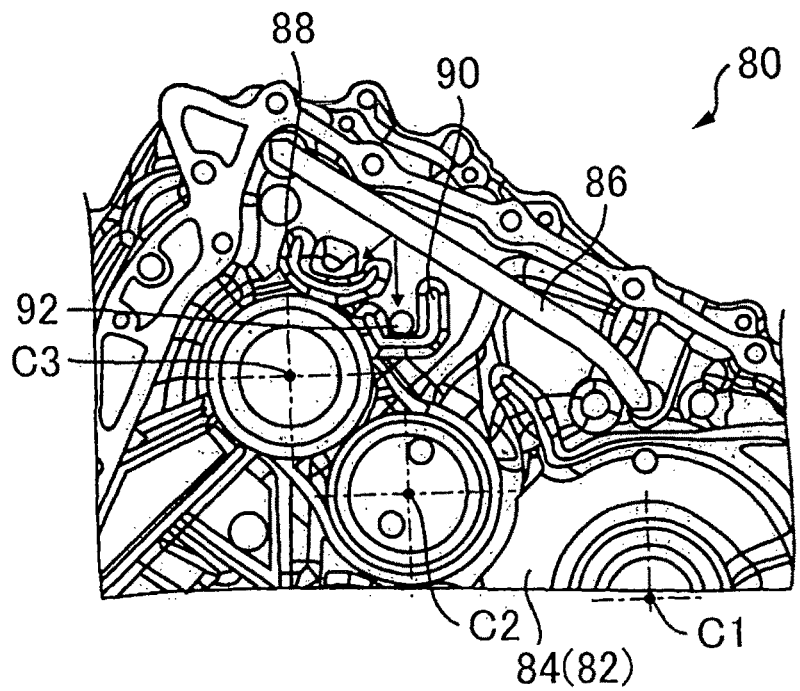
FIG. 4 shows a portion of a side wall of a case in a drive apparatus that is another example of the present invention.

FIG. 4 shows a portion of a side wall 84 of a case 82 in a vehicle drive apparatus 80 (hereinafter a drive apparatus 80) that is the other example, and corresponds to FIG. 2 in the above-described example. In FIG. 4, various types of the rotational members and various types of the gears, such as the second electric motor MG2 and the counter driven gear 40, are not shown, but only the side wall 84 of the case 82 is shown (the side wall 52 in the above-described example). However, the same rotational members as those of the above-described example are actually arranged. More specifically, the input shaft 20, the power distribution mechanism 22, the composite gear shaft 36 formed with the counter drive gear 35, and the first electric motor MG1 are arranged on the first axis C1. The countershaft 30 that is formed of the counter driven gear 40 and the differential drive gear 42 is arranged on the second axis C2. The second electric motor MG2 and the power transmission shaft 26 formed with the reduction gear 38 are arranged on the third axis C3. Although not shown, the differential gear 32 is arranged on the fourth axis C4.

Similarly, the side wall 84 in FIG. 4 is provided with a bypass pipe 86 that feeds the pumped-up oil by the oil pump 37 to the motor chamber 21 side, in which the first electric motor MG1 and the second electric motor MG2 are housed. In this example, a U-shaped first catch tank 88 is formed to supply the oil to the bearing for supporting the second rotor shaft 28 of the second electric motor MG2. In addition, a U-shaped second catch tank 90 is formed to supply the oil to the bearing for rotatably supporting the countershaft 30 that is formed with the counter driven gear 40. The oil reserved in this first catch tank 88 flows through a cooling oil passage, which is not shown, and is supplied to the bearing of the second rotor shaft 28 of the second electric motor MG2. The oil reserved in the second catch tank 90 flows through a lubrication hole 92 and is supplied to the bearing of the countershaft 30 and the like via the lubrication oil passage, which is not shown. The bypass pipe 86 corresponds to the pipe.

Figure 5:
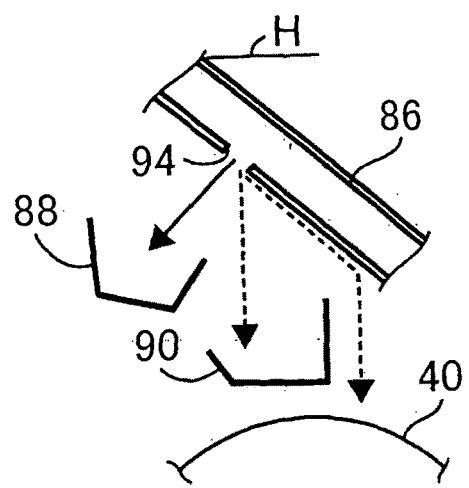
FIG. 5 shows a structure on the periphery of a first catch tank and a second catch tank in FIG. 4 in a further simplified manner according to the other example.

FIG. 5 shows a structure on the periphery of the first catch tank 88 and the second catch tank 90 in FIG. 4 in a further simplified manner. Also in this example, the bypass pipe 86 is provided above the counter driven gear 40 in the vertical direction and is also provided to be tilted with respect to a horizontal line H. A discharge hole 94 is formed in a portion of the bypass pipe 86 located above the counter driven gear 40 in the vertical direction. The discharge hole 94 corresponds to the hole for discharging some of the oil flowing through the pipe.

The first catch tank 88 is provided in the normal line direction (on a normal line) of the discharge hole 94. In detail, the first catch tank 88 is formed to receive the oil that is released from the discharge hole 94 along the normal line direction. In addition, the second catch tank 90 is formed below the discharge hole 94 in the vertical direction, so as to receive the oil that is dripped vertically downward from the discharge hole 94.

A description will be made on lubrication of various types of the gears and cooling of the electric motor in the drive apparatus 80 that is configured as described above. First, a case where the oil temperature is low will be described. When the oil temperature is low, the viscosity of the oil is high. Thus, the required oil amount is not easily supplied to the counter driven gear 40 simply by throwing up the oil. Meanwhile, also in this example, the bypass pipe 86 is formed with the discharge hole 94, and the oil in the bypass pipe 86 is discharged from the discharge hole 94. Since the viscosity of the oil is high, the oil is not shot out toward the first catch tank 88 but is dripped vertically downward as indicated by the broken arrow. Alternatively, the oil temporarily streams down an outer peripheral surface of the bypass pipe 86, is then separated therefrom, and is dripped vertically downward. Thus, some of the oil discharged from the discharge hole 94 is dripped vertically downward from the discharge hole 94 and supplied to the second catch tank 90 that is positioned below the discharge hole 94 in the vertical direction. Then, the oil is supplied to the bearing for supporting the counter driven gear 40 via the second catch tank 90. Rest of the oil that is discharged from the discharge hole 94 and not supplied to the second catch tank 90, streams down the outer peripheral surface of the bypass pipe 86, is dripped vertically downward as indicated by the broken arrow, and is directly supplied to the counter driven gear 40.

As described above, when the oil temperature is low, that is, when the oil is not easily supplied to the counter driven gear 40, the oil discharged from the discharge hole 94 is supplied to the counter driven gear 40 and the bearing for supporting the counter driven gear 40. Thus, the counter driven gear 40 and the bearing for supporting the counter driven gear 40 are lubricated.

Next, a case where the oil temperature is high will be described. When the oil temperature is high, the viscosity of the oil is low. Thus, an amount of the thrown-up oil is increased, and the agitation resistance caused by the oil agitation tends to be increased. Meanwhile, due to the low viscosity of the oil, the oil discharged from the discharge hole 94 is released in the normal line direction as indicated by a solid arrow and supplied to the first catch tank 88. Thus, the oil that is supplied to the first catch tank 88 is not supplied to the counter driven gear 40 but is supplied to the bearing that rotatably supports the second rotor shaft 28 of the second electric motor MG2. As described above, when the oil temperature is high, the oil is supplied to the bearing for supporting the second rotor shaft of the second electric motor MG2. Thus, abrasion resistance at a high rotational speed and at the high temperature is improved. In addition, when the oil temperature is high, the oil is not directly supplied to the counter driven gear 40. Thus, the increase in the agitation loss that is caused by the larger amount of the oil supply than the required amount is prevented.

As described above, a supply destination of the oil that is discharged from the discharge hole 94 is switched between the first catch tank 88 and the second catch tank 90 in accordance with the oil temperature. Even in such a case of this example, substantially the same effects as those of the above-described example can be obtained. More specifically, for example, when the viscosity of the oil is high and it is difficult to secure the required oil amount for the lubrication of the counter driven gear 40, the oil is supplied to the second catch tank 90. Then, the required oil amount is supplied to the counter driven gear 40 via the second catch tank 90. On the other hand, when the oil temperature is high and the viscosity of the oil is low, the oil is supplied to the first catch tank 88. Then, the oil is preferentially supplied to the bearing for supporting the second rotor shaft 28 of the second electric motor MG2 via the first catch tank 88. Thus, the abrasion resistance of the bearing that is actuated at a high rotational speed and a high temperature is improved.

The examples of the present invention have been described so far in detail on the basis of the drawings. However, the present invention is applied to other aspects.

For example, each of the bypass pipes 58, 86 is provided above the counter driven gear 40 in the vertical direction in the above-described examples. However, this is merely an example, and a type of a gear is not particularly limited as long as the gear needs to be lubricated.

In addition, in the above-described example, the side wall 52 is formed in the normal line direction of the discharge hole 62. However, the present invention is not necessarily limited to the formation of the side wall. Similarly, the first catch tank 88 is arranged in the normal line direction of the discharge hole 94. However, the present invention is not necessarily limited thereto.

In the above-described example, in the drive apparatus 12, the first electric motor MG1 and the second electric motor MG2 are arranged on the different rotational shafts. However, the present invention is not limited to the drive apparatus 12, and can appropriately be applied to a drive apparatus that is configured by including an electric motor and a gear mechanism.

The oil pump 37 of the above-described examples is driven by the countershaft 30. However, this is merely an example. The oil pump 37 may be driven by another rotational shaft, such as the power transmission shaft 26 or the input shaft 20.

In the above-described example, the side wall 52 is cooled by the traveling wind. However, the present invention is not limited thereto. The side wall 52 may not be cooled by the traveling wind. Alternatively, the side wall 52 may be cooled by another aspect such as a water cooling method.

In the above-described examples, it is configured that the differential ring gear 46 is soaked in the oil and that the oil is thrown up by the rotation of the differential ring gear 46. However, this is merely an example. A structure for throwing up the oil by another gear may be adopted.

In the above-described examples, the bypass pipes 58, 86 are formed cylindrically, but the shapes thereof are not limited to a cylinder. The shapes thereof can appropriately be changed, so as to have a square cross section, for example.

What has been described so far is merely an embodiment. The present invention can be implemented in the aspects in which various modifications or improvements are made on the basis of knowledge of a person skilled in the art.

What is claimed is:

1. A vehicle drive apparatus comprising:
    a case in which oil is reserved;
    an electric motor housed in the case;
    a gear mechanism housed in the case, and the gear mechanism including a specified gear and a first gear, a vertical lower section of the first gear positioned above a surface of the oil in a vertical direction;
    a lubrication mechanism configured to lubricate the gear mechanism by the oil thrown up by the specified gear;
    a cooling mechanism including an oil pump and a pipe, the cooling mechanism configured to pressure-feed the oil reserved in the case by the oil pump and supply the oil to the electric motor to cool the electric motor, and the pipe configured to feed the oil discharged from the oil pump to the electric motor,
    the pipe located above the first gear in the vertical direction, and the pipe having a hole, some of the oil flowing through the pipe being discharged from the hole, the hole being positioned above the first gear in the vertical direction, the hole being arranged at a position where a normal line direction of the hole differs from a vertically downward direction from the hole, and
    the first gear being arranged at a position that does not overlap the normal line direction of the hole.

2. The vehicle drive apparatus according to claim 1 wherein
    the case is arranged in the normal line direction of the hole, and
    the case is configured to be exposed to a traveling wind.

3. The vehicle drive apparatus according to claim 1 further comprising:
    an engine;
    a drive wheel;
    a countershaft configured to transmit power of the engine to the drive wheel;
    a first electric motor;
    a second electric motor;
    a power distribution mechanism configured to distribute the power to the first electric motor and an output shaft;
    a counter driven gear arranged on the countershaft;
    an output gear arranged on the output shaft; and
    a power transmission shaft configured to transmit the power to a rotor shaft of the second electric motor, wherein
    the engine, the first electric motor, and the power distribution mechanism are arranged on a first axis,
    the countershaft is arranged on a second axis,
    the second electric motor and the power transmission shaft are arranged on a third axis,
    the counter driven gear meshes with the output gear , and the counter driven gear meshes with a gear that is disposed on the power transmission shaft, and
    the first gear is the counter driven gear.

4. The vehicle drive apparatus according to claim 1 further comprising:
    a first catch tank arranged at a position in the normal line direction of the hole, the first catch tank configured to supply the oil to a bearing and receive the oil discharged from the hole in the normal line direction, and the bearing configured to support a rotor shaft of the electric motor; and
    a second catch tank arranged at a position below the hole in the vertical direction, and the second catch tank configured to supply the oil to a gear that needs to be lubricated, and the second catch tank configured to receive the oil dripped vertically downward from the hole, wherein
    the pipe is arranged to be tilted with respect to a horizontal line.

5. The vehicle drive apparatus according to claim 1, wherein the hole is positioned in a sidewall of the pipe.

* * * * *